(12) United States Patent
Zhang et al.

(10) Patent No.: US 9,948,540 B2
(45) Date of Patent: Apr. 17, 2018

(54) METHOD AND SYSTEM FOR DETECTING PROXY INTERNET ACCESS

(71) Applicant: Sangfor Technologies Company Limited, Shenzhen (CN)

(72) Inventors: Zhiliang Zhang, Shenzhen (CN); Jingbo Liang, Shenzhen (CN)

(73) Assignee: Sangfor Technologies Company Limited, Shenzhen (CN)

( * ) Notice: Subject to any disclaimer, the term of this patent is extended or adjusted under 35 U.S.C. 154(b) by 274 days.

(21) Appl. No.: 14/919,824

(22) Filed: Oct. 22, 2015

(65) Prior Publication Data

US 2016/0119193 A1    Apr. 28, 2016

(30) Foreign Application Priority Data

Oct. 23, 2014  (CN) .......................... 2014 1 0572968

(51) Int. Cl.
| | |
|---|---|
| *G06F 15/173* | (2006.01) |
| *H04L 12/26* | (2006.01) |
| *H04L 12/24* | (2006.01) |
| *H04L 29/06* | (2006.01) |
| *H04W 12/12* | (2009.01) |

(52) U.S. Cl.
CPC .......... *H04L 43/106* (2013.01); *H04L 41/142* (2013.01); *H04L 43/0858* (2013.01); *H04L 63/0281* (2013.01); *H04W 12/12* (2013.01)

(58) Field of Classification Search
CPC ............... H04L 43/106; H04L 63/0281; H04L 43/0858; H04L 41/142; H04W 12/12
See application file for complete search history.

(56) References Cited

U.S. PATENT DOCUMENTS

| | | | |
|---|---|---|---|
| 7,519,702 B1 * | 4/2009 | Allan | .................... G06F 15/173 709/201 |
| 2011/0173318 A1 * | 7/2011 | Ma | ...................... H04L 67/2819 709/224 |

* cited by examiner

*Primary Examiner* — John B Walsh
(74) *Attorney, Agent, or Firm* — Anova Law Group, PLLC (57) ABSTRACT

A method for detecting proxy internet access includes intercepting an access request from a proxied terminal of a same internet account; and sending a redirection packet to the proxied terminal sending the access request. The redirection packet carries a first timestamp indicating when the redirection packet is sent. The method also includes receiving a reported timestamp difference between the first timestamp and a second timestamp. The second timestamp is a system time of the proxied terminal acquired after the proxied terminal receives the redirection packet. Further, the method includes executing a clustering process on the reported timestamp difference to obtain a clustering result; and based on the clustering result, detecting whether the same internet account is a proxy account.

20 Claims, 7 Drawing Sheets

METHOD AND SYSTEM FOR DETECTING PROXY INTERNET ACCESS

CROSS-REFERENCES TO RELATED APPLICATIONS

This application claims priority of Chinese Patent Application No. 201410572968.1, filed on Oct. 23, 2014, the entire contents of which are hereby incorporated by reference.

FIELD OF THE INVENTION

The present disclosure generally relates to the field of internet technologies and, more particularly, relates to a method and system for detecting proxy internet access.

BACKGROUND

With the development of internet technology, broadband internet access becomes a reality and demand for more and more users. However, different from the independent broadband internet access, many users share their own broadband internet access with others by routing equipment or proxy software. As a broadband internet account may be shared by a lot of people through a proxy, the cost of broadband internet access may be decreased, and even a profit may be made by the account holder. The sharing of broadband internet access brings huge economic losses to network operators.

The traditional methods for detecting proxy internet access generally fall into two types: the first type is to determine whether a proxy is used according to the change of the connection number of a single internet account, or whether the connection number of a single internet account exceeds a certain threshold; and the second type is to detect proxy internet access by statistically finding the characteristics of the identities (ID) of internet protocol (IP) packets, and the characteristics of the sequence numbers of transmission control protocols (TCP). The first type of method for detecting proxy internet access relies on the rationality of threshold, but it may be difficult to determine a reasonable threshold. Proxy internet access could not be detected by the second type of method if the router could support the modification of the ID information of IP packets and the serial numbers of TCP packets. Therefore, the accuracy of these two types of methods for detecting proxy internet access is low.

The disclosed methods and systems are directed to solve one or more problems set forth above and other problems in the art.

BRIEF SUMMARY OF THE DISCLOSURE

One aspect of the present disclosure includes a method for detecting proxy internet access. The method includes intercepting an access request from a proxied terminal of a same internet account; and sending a redirection packet to the proxied terminal sending the access request. The redirection packet carries a first timestamp indicating when the redirection packet is sent. The method also includes receiving a reported timestamp difference between the first timestamp and a second timestamp. The second timestamp is a system time of the proxied terminal acquired after the proxied terminal receives the redirection packet. Further, the method includes executing a clustering process on the reported timestamp difference to obtain a clustering result; and based on the clustering result, detecting whether the same internet account is a proxy account.

Another aspect of the present disclosure includes a system for detecting proxy internet access. The system includes an interception module, a redirection module, a receiving module, a processing module, and a detection module. The interception module is configured to intercept the access requests of a same internet account. The redirection module is configured to send a redirection packet to an access request, wherein the redirection packet carries the first timestamp indicating when the redirection packet is sent. The receiving module is configured to receive the reported timestamp difference between the first timestamp and the second timestamp, wherein the second timestamp is the system time of the proxied terminal acquired after the proxied terminal receives the redirection packet. The processing module is configured to execute a clustering process on the reported timestamp differences to obtain a clustering result. The detection module is configured to, based on the clustering result, determine whether the same internet account is a proxy access account.

Another aspect of the present disclosure includes a non-transitory computer-readable medium having computer program. When being executed by a processor, the computer program performs a method for detecting proxy internet access. The method includes intercepting an access request from a proxied terminal of a same internet account; and sending a redirection packet to the proxied terminal sending the access request. The redirection packet carries a first timestamp indicating when the redirection packet is sent. The method also includes receiving a reported timestamp difference between the first timestamp and a second timestamp. The second timestamp is a system time of the proxied terminal acquired after the proxied terminal receives the redirection packet. Further, the method includes executing a clustering process on the reported timestamp difference to obtain a clustering result; and based on the clustering result, detecting whether the same internet account is a proxy account.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
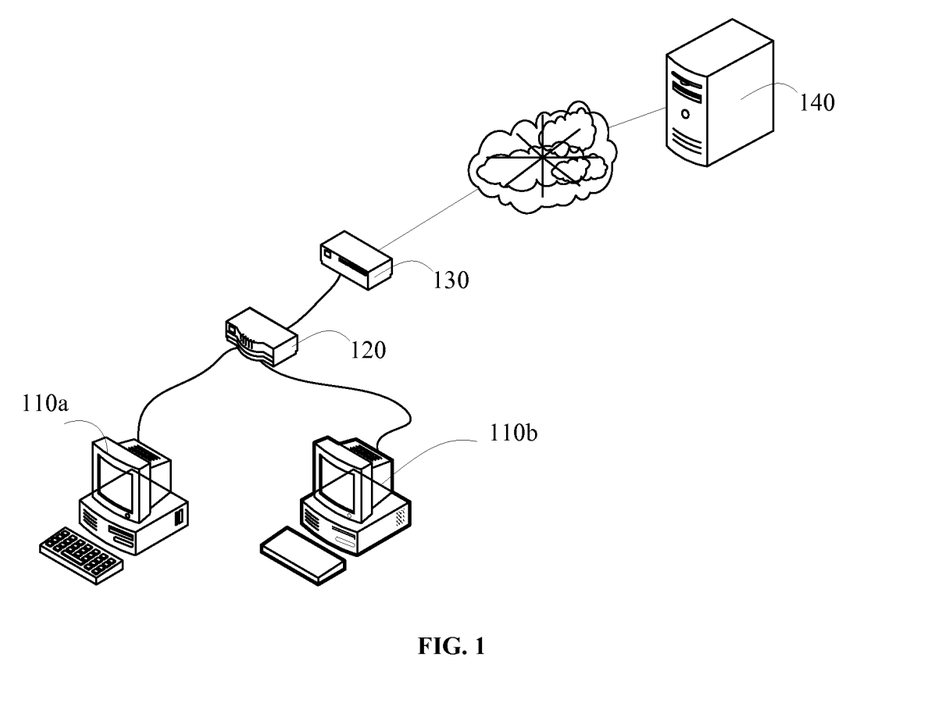
FIG. 1 illustrates an exemplary application environment consistent with the disclosed embodiments.

FIG. 1 illustrates an exemplary application environment of a method and a system for detecting proxy internet access. As shown in FIG. 1, the application environment may include a proxied terminal 110a, a proxied terminal 110b, a router 120, a proxy detection device 130, and a server 140.

Although two proxied terminals 110a and 110b are shown in the application environment, there may be any number of proxied terminals, such as two or more proxied terminals. A proxied terminal 110a or 110b may be a personal computer, a tablet, a smart phone, a personal digital assistant, etc. In certain embodiments, the proxied terminal may also be a virtual terminal and multiple virtual proxied terminals may be running from one or more physical terminals.

The router 120 may be a physical router or a virtual router, and multiple virtual routers may be running from one or more physical routers. The proxy detection device 130 may be a physical proxy detection device or a virtual proxy detection device, and multiple virtual proxy detection devices may be running from one or more physical proxy detection devices. The server 140 may be a physical server or a virtual server, and multiple virtual servers may be running from one or more physical servers.

Figure 11:
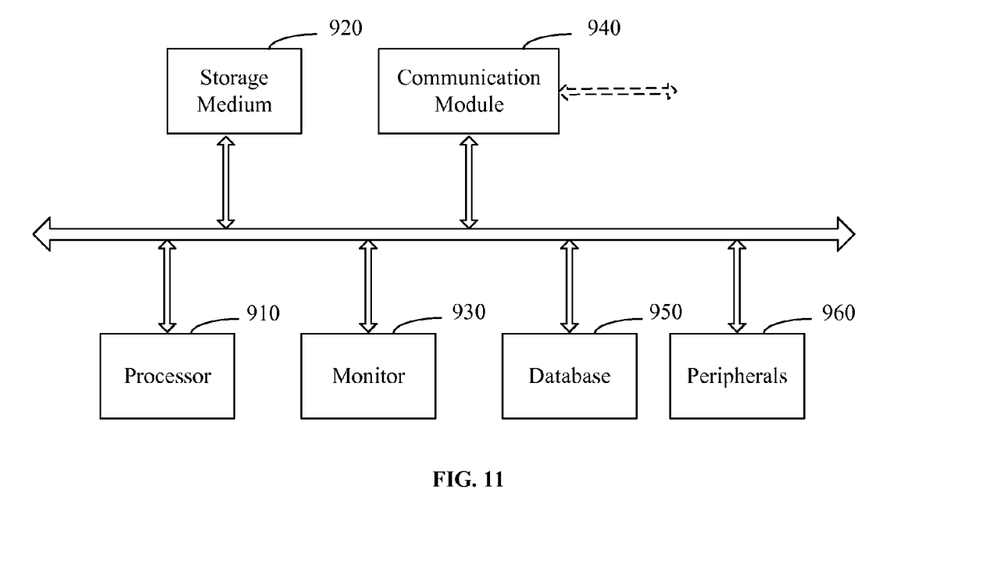
FIG. 11 illustrates an exemplary computing system that may be used to implement the proxy detection methods and systems consistent with the disclosed embodiments.

FIG. 11 illustrates an exemplary computing system that may be used to implement the proxy detection device 130. As shown in FIG. 11, the computing system may include a processor 910, a storage medium 920, a monitor 930, a communication module 940, a database 950, and peripherals 960. Certain devices may be omitted and other devices may be included.

Processor 910 may include any appropriate processor or processors. Further, processor 910 can include multiple cores for multi-thread or parallel processing. Storage medium 920 may include memory modules, such as ROM, RAM, flash memory modules, and erasable and rewritable memory, and mass storages, such as CD-ROM, U-disk, and hard disk, etc. Storage medium 920 may store computer programs for implementing various processes, when executed by processor 910.

Further, peripherals 960 may include I/O devices such as keyboard and mouse, and communication module 940 may include network devices for establishing connections through the communication network. Database 950 may include one or more databases for storing certain data and for performing certain operations on the stored data, such as database searching.

The proxied terminals 110a and the proxied terminal 110b may initiate an access request to the server 140 via the router 120. The proxied terminals 110a and 110b, both connected to the router 120, may access the server 140 via the same internet account. An access request may be, for example, a hypertext transfer protocol (HTTP) GET request.

The proxy detection device 130 is deployed between the server 140 and the router 120, for intercepting access requests, redirecting access requests, and sending redirection packets to the proxied terminal 110a or 110b that initiates the access requests. The redirection packet includes a preset script code, and the script code carries a first timestamp indicating the moment when the redirection packet is sent. Redirection refers to redirecting a variety of network requests to other locations, and an HTTP redirection refers to redirecting an original HTTP request to another website. A script code refers to Javascript or the like, a case-sensitive, dynamical-type, object-oriented and prototype-inheritance client script language that is evolved from the LiveScript of Netscape.

After receiving a redirection packet, the proxied terminal executes the script code to obtain the system time of the proxied terminal, i.e. the second time stamp, and calculates the timestamp difference between the first timestamp and the second timestamp. The proxied terminal then reports the timestamp difference to the proxy detection device 130 through an access request (such as an HTTP GET request).

The proxy detection device 130 executes a clustering process on the timestamp difference between the first timestamp and the second timestamp to obtain the clustering result of the timestamp difference, and determines whether the same internet account is a proxy internet account according to the clustering result.

Specifically, proxy internet access refers to the use of a router or a proxy tool so that multiple individuals or terminals may share an internet IP address for internet access. For example, if a user uses ASDL to access internet, a subnet can be established by connecting a router under the ASDL modem, and the multiple terminals connected to the LAN port of the router may access internet by proxy through the router.

If an internet account has proxy internet access activities, this internet account is a proxy account. As the system time of each proxied terminal is not totally same as that of others, after a period of redirection, multiple difference classifications that are totally different may be obtained. If an internet account only allows the use of one proxied terminal, by detecting the presence of more than one proxied terminals under the same internet account, proxy internet access can be confirmed.

For example, in an internet account, the timestamp difference between the first timestamp and the second timestamp of the proxy terminal A is −4, −4, −3, −4, −5, and the timestamp difference between the first timestamp and the second timestamp of the proxy terminal B is 20, 21, 20, 19, 20, where the unit of timestamp difference is second. So the timestamp difference of the proxied terminal A gathers at the center −4, and the timestamp difference of the proxied terminal B gathers at the center 20. According to the two different gathering centers or clusters, the presence of two proxied terminals of the same internet account can be determined, i.e., proxy internet access activities are detected.

Figure 2:
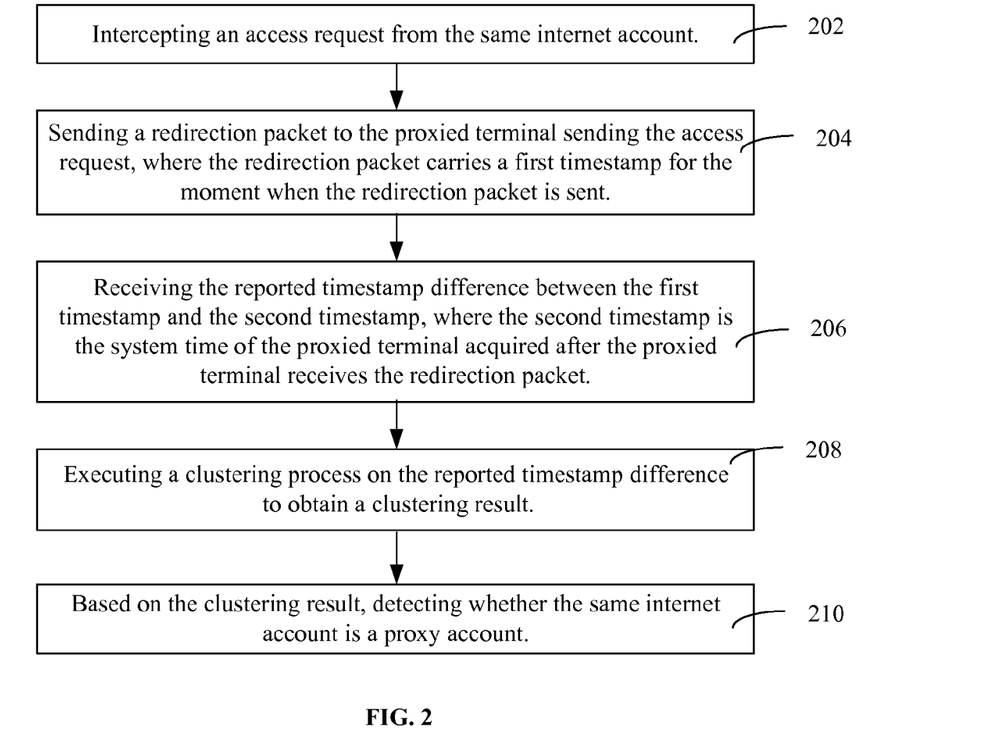
FIG. 2 illustrates a schematic flow chart of an exemplary method for detecting proxy internet access consistent with the disclosed embodiments.

FIG. 2 illustrates a schematic flow chart of an exemplary method for detecting proxy internet access. The method for detecting proxy internet access shown in FIG. 2 is operated in the application environment shown in FIG. 1, and is described from the aspect of the proxy detection device. As shown in FIG. 2, the method for detecting proxy internet access comprises following steps.

Step 202: intercepting an access request from the same internet account.

Specifically, the proxy detection device intercepts an access request from the same internet account. The access request may be an HTTP GET request. If there are more than one proxied terminals under the same internet account, these proxied terminals access internet through the same internet account.

Step 204: sending a redirection packet to the proxied terminal sending the access request, where the redirection packet carries a first timestamp for the moment when the redirection packet is sent. Specifically, the redirection packet may include a preset script code.

Step 206: receiving the reported timestamp difference between the first timestamp and the second timestamp, where the second timestamp is the system time of the proxied terminal acquired after the proxied terminal receives the redirection packet.

Specifically, after the proxied terminal initiating the access request receives a redirection packet, the proxied terminal executes the script code in the redirected packet to obtain the system time of the proxied terminal, i.e., the second time stamp. Then the proxied terminal calculates the timestamp difference between the first time stamp and the second time stamp, and reports the calculated timestamp difference to the proxy detection device.

Step 208: executing a clustering process on the reported timestamp difference to obtain a clustering result.

Specifically, the proxy detection device executes a clustering process to the reported timestamp difference, i.e., categorizes the reported timestamp difference, to determine the cluster which the reported timestamp difference belongs to.

Step 210: based on the clustering result, detecting whether the same internet account is a proxy account.

Specifically, after the reported timestamp difference is clustered, one or more clusters can be obtained. Based on final number of clusters and the maximum allowable number of proxied terminals of the same internet account, the proxy detection device may determine whether the internet account is a proxy account. If the number of clusters is larger than the maximum allowable number of proxied terminals, the internet account is a proxy account. If the number of clusters is less than or equal to the maximum allowable number of proxied terminals, the internet account is not a proxy account. For example, if the number of clusters is 5, and the maximum allowable number of proxied terminals of the internet account is 4, it can be determined that the internet account has proxy internet access activities, and the internet account is a proxy account.

In the method for detecting proxy internet access, the proxy detection device intercepts the access requests of the same internet account, sends redirection packets which carry the first timestamp, and receives the timestamp differences between the first timestamp and the second time stamp acquired after the proxied terminal receives the redirection packets. By executing clustering process to the timestamp differences, the proxy detection device can, based on the clustering results, determine whether the same internet account is a proxy account.

By categorizing the timestamp differences between the timestamp of sending the redirection packet and the timestamp after the proxied terminal receives the redirection packet, the disclosed method for detecting proxy internet access may avoid the detection error due to the changes of the ID information of the IP packet and the serial number information of the TCP packet, and thus the detection accuracy is increased.

In certain embodiments, the Step 202 and Step 204 may be executed at one stage, and the Steps 206, 208 and 210 may be executed at a later stage.

Figure 3:
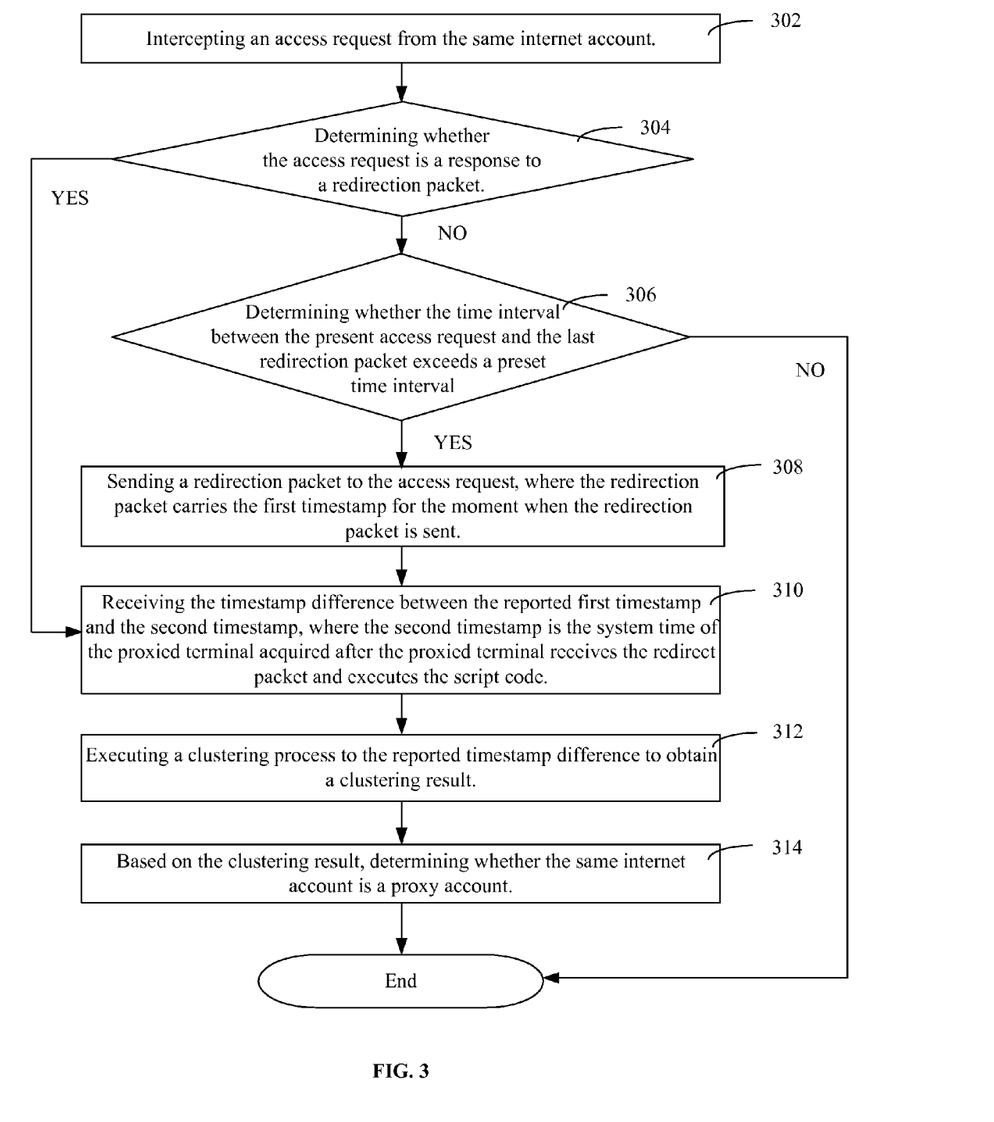
FIG. 3 illustrates a schematic flow chart of another exemplary method for detecting proxy internet access consistent with the disclosed embodiments.

FIG. 3 illustrates a flow chart of another exemplary method for detecting proxy internet access. As shown in FIG. 3, the method for detecting proxy internet access includes following steps.

Step 302: intercepting an access request from the same internet account.

Step 304: determining whether the access request is a response to a redirection packet. If the access request is a response to a redirection packet, the process goes to Step 310. If the access request is not a response to a redirection packet, the process goes to Step 306.

Specifically, to determine whether an access request is a response to a redirection packet, the proxy detection device first checks whether the target IP address of the access request is a proxy detection device, and/or whether the proxied terminal communicates with a specific port (such as port 89 etc.) of a proxy detection device. The proxy detection device further checks whether the access request contains a specific string of response data of the proxy detection device, such as "GET/info? ip=### & interval=###" and so on. If the access request contains a specific string of response data of the proxy detection device, the access request is a response to a redirection packet.

Step 306: determining whether the time interval between the present access request and the last redirection packet exceeds a preset time interval, i.e., the time between receiving the present access request and sending the last redirection packet. If the time interval between the present access request and the last redirection packet exceeds the preset time interval, the process goes to Step 308. If the time interval between the present access request and the last redirection packet does not exceed the preset time interval, the process ends.

Specifically, the preset time interval is the time interval for redirection, and it may be set according to actual needs. For example, if the preset time interval is one minute, redirection happens every one minute. The purpose of setting a preset time interval is to prevent a cycle or a loop of redirection so as to avoid impact on users' access to the network. For example, when the proxied terminal A visits www.abc.com, after the access request is redirected, the redirected script code may refresh the access request of the proxied terminal A to www.abc.com. If there is no preset time interval, for an HTTP GET request, when the script code refreshes the access request of the proxy terminal A to www.abc.com, the access request may be redirected again, leading to the cycle of redirection, and as a result, the webpage could not be opened.

The preset time interval T may be adjusted according to actual needs. The smaller the value of T, the greater the impact on users' access to the network, and the faster the speed of proxy internet access detection. The greater the value of T, the smaller the impact on users' access to the network, and the slower the speed of proxy internet access detection.

Step 308: sending a redirection packet to the access request, where the redirection packet carries the first timestamp for the moment when the redirection packet is sent.

Step 310: receiving the timestamp difference between the reported first timestamp and the second timestamp, where the second timestamp is the system time of the proxied terminal acquired after the proxied terminal receives the redirect packet and executes the script code.

Specifically, if the access request is a response to a redirection packet, the proxy detection device obtains the timestamp difference between the reported first timestamp and the second timestamp from the response, where the second timestamp is the system time of the proxied terminal acquired after the proxied terminal receives the redirect packet and executes the script code.

Step 312: executing a clustering process to the reported timestamp difference to obtain a clustering result.

Specifically, the clustering process on the reported timestamp difference is categorizing the timestamp difference to determine which cluster the timestamp difference belongs to.

Step 314: based on the clustering result, determining whether the same internet account is a proxy account.

In the disclosed method for detecting proxy internet access, the proxy detection device intercepts an access request of the same internet account, determines whether the access request is a response to a redirection packet. If the access request is a response to a redirection packet, the proxy detection device extracts the timestamp difference from the response. If the access request is not a response to a redirection packet, the system determines whether the data interval between the current access request and the last redirection packet exceeds a preset time interval.

If the data interval exceeds a preset time interval, the proxy detection device sends the redirection packet that carries the first timestamp, and receives the timestamp difference between the first timestamp and the second timestamp acquired after the proxied terminal receives the redirection packet. The proxy detection device then executes a clustering process to the timestamp difference. According to the clustering result, the proxy detection device may determine whether the same internet account is a proxy access account.

By categorizing the timestamp difference between the timestamp of sending a redirection packet and the timestamp after the proxied terminal receives the redirection packet, the detection error due to the changes of the ID information of the IP packet and the serial number information of the TCP packet may be avoided, and the detection accuracy is thus improved. Further, by analyzing the time interval between the access request and sending the last redirection packet, the impact on users' internet access may be reduced.

Figure 4:
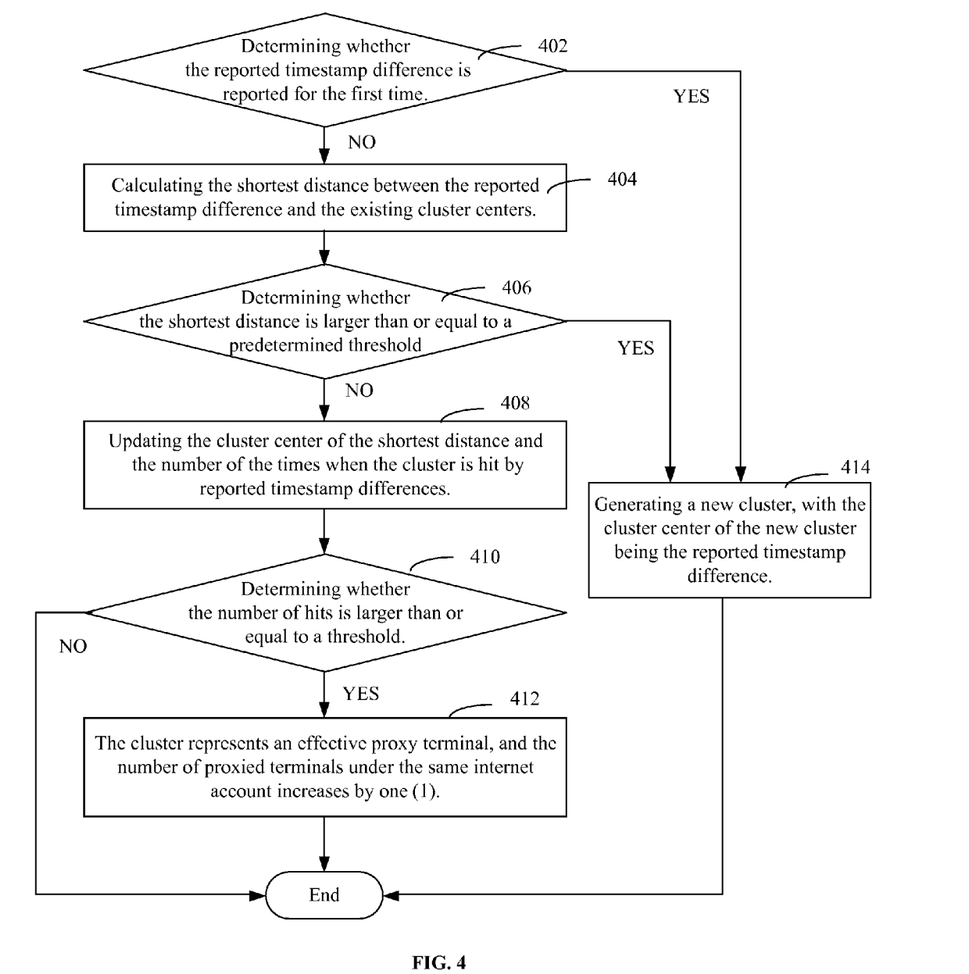
FIG. 4 illustrates a schematic flow chart for obtaining a clustering result by executing a clustering process on the reported timestamp difference, consistent with the disclosed embodiments.

FIG. 4 illustrates a schematic flow chart for obtaining a clustering result by executing a clustering process on the reported timestamp difference. As shown in FIG. 4, obtaining a clustering result by executing a clustering process on the reported timestamp difference includes following steps.

Step 402: determining whether the reported timestamp difference is reported for the first time. If the reported timestamp difference is reported for the first time, the process goes to Step 414. If the reported timestamp difference is not reported for the first time, the process goes to Step 404.

Step 404: calculating the shortest distance between the reported timestamp difference and the existing cluster centers.

Specifically, if there are multiple cluster centers, the proxy detection device calculates the distance of the reported timestamp difference to each cluster center, and then chooses the shortest distance.

Step 406: determining whether the shortest distance is larger than or equal to a predetermined threshold. If the shortest distance is larger than or equal to the threshold, the process goes to Step 414. If the shortest distance is less than the threshold, the process goes to Step 408.

Specifically, the value of the threshold may be set depending on the practical circumstances, for example, 3, 4 seconds and so on.

Step 408: updating the cluster center of the shortest distance and the number of the times when the cluster is hit by reported timestamp differences.

Specifically, the way for updating the cluster center of the shortest distance may be taking the average value of all the timestamp differences of the cluster as the new cluster center, or taking the average value of the timestamp differences excluding the minimum and maximum timestamp difference values, as the new cluster center.

The steps for counting the number of times 'A' when a cluster is hit by reported timestamp differences and calculating the accumulated reported timestamp difference 'B', and updating the cluster center include: adding the present reported timestamp difference to the accumulated timestamp difference to get the new accumulated timestamp difference; increasing the number of hits by one (1) to get the new number of hits; and obtaining the new cluster center by dividing the new accumulated timestamp difference with the new number of hits.

Step 410: determining whether the number of hits is larger than or equal to a threshold. If the number of hits is larger than or equal to the threshold, the process goes to Step 412. If the number of hits is less than a threshold, the process ends.

If the number of hits of a cluster is larger than or equal to a threshold, the cluster represents an effective proxied terminal, and the number of proxied terminals under the same internet account increases by one (1). If the number of hits of a cluster is less than the threshold, the number of proxied terminals under the same internet account remains unchanged.

Step 412: the cluster represents an effective proxy terminal, and the number of proxied terminals under the same internet account increases by one (1).

Step 414: generating a new cluster, with the cluster center of the new cluster being the reported timestamp difference.

Thus, the above clustering process only requires simple calculations, and the clustering efficiency of the clustering process is substantially high.

Figure 5:
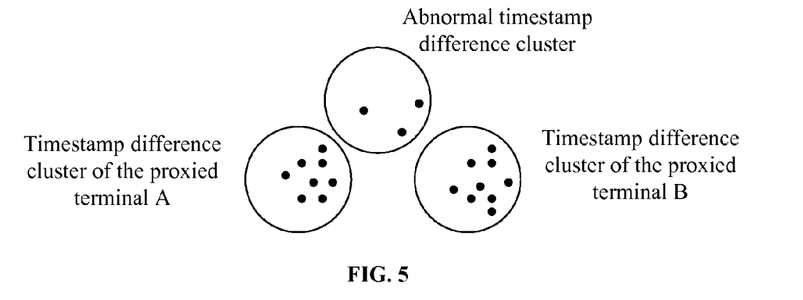
FIG. 5 illustrates a schematic chart of a clustering result consistent with the disclosed embodiments.

FIG. 5 illustrates a schematic chart of a clustering result. In FIG. 5, the clustering is explained with the proxied terminal A and the proxied terminal B as examples. A proxy detection device receives an HTTP GET request from the proxied terminal A, detects the time interval which satisfies the redirection requirement, and sends an HTTP redirection packet, where the redirection packet includes the first timestamp Td1 for the moment when the proxy detection device sends the redirection packet.

After receiving the redirection packet, the proxied terminal A acquires the system time of the proxied terminal A, i.e., the second timestamp Ta, and then calculates the timestamp difference between the first timestamp Td1 and the second timestamp Ta. The proxied terminal A further uses the HTTP GET request that carries the timestamp difference to report the timestamp difference to the proxy detection device. The proxy detection device then categorizes the reported timestamp difference according to the proxied terminal A corresponding to the internet account. The proxied terminal B executes the same procedure.

After a period of redirection, following results may be obtained: the timestamp differences reported by the proxied terminal A are −4, −4, −3, −4, −5, . . . , and the timestamp differences reported by the proxied terminal B are 20, 21, 20, 19, 20, . . . . The reported timestamp differences from each proxied terminal fall into a small error range. Based on the clustering processing, the close timestamp differences are clustered together, and the faraway timestamp differences are classified into different categories corresponding to different proxied terminals. For example, the timestamp differences from the proxied terminal A are gathered within a certain radius, and the timestamp differences from the proxied terminal B are gathered in another radius.

In an exemplary embodiment, to ensure the detection effect, the method for detecting proxy access includes following three steps.

First, getting a preset maximum allowable number of proxied terminals under the same internet account.

Second, based on the maximum allowable number of proxied terminals, obtaining the required number of discrete time and the predetermined sequence of the required number of discrete time.

Figure 6:
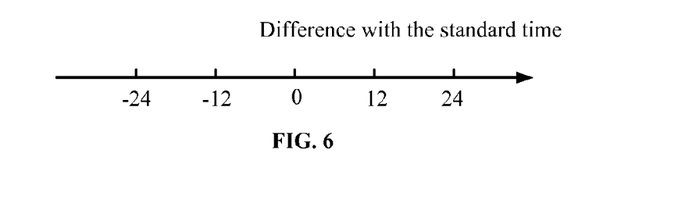
FIG. 6 illustrates a schematic chart of exemplary time discreteness consistent with the disclosed embodiments.

For example, if the maximum allowable number of proxied terminals is four (4), the required number of the discrete time is five (5). The predetermined sequence of the required number of the discrete time may be +24 seconds, −24 seconds, +12 seconds, −12 seconds and 0 seconds. As shown in FIG. 6, the discrete time values are +24 seconds, −24 seconds, +12 seconds, −12 seconds, and 0 seconds.

Third, upon detecting the automatic update of the system time of each proxied terminal under the same internet account, according to the sequence of the required number of discrete time, sequentially executing a uniform discretization process on the system time of each proxied terminal.

Figure 7:
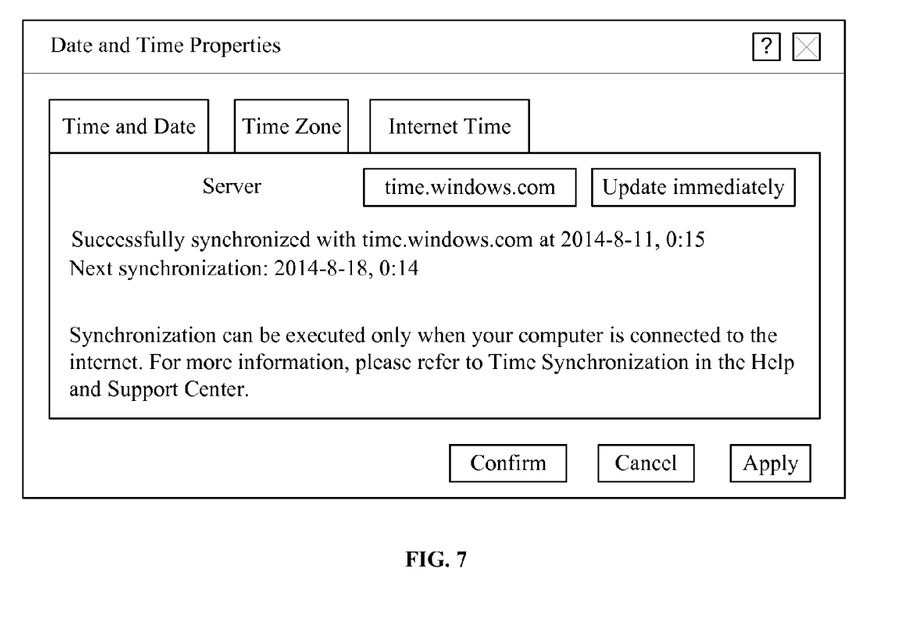
FIG. 7 illustrates a schematic screen shot of an exemplary interface for updating the time setting of a proxied terminal consistent with the disclosed embodiments.

FIG. 7 illustrates a schematic chart of an exemplary interface for updating the time setting of a proxied terminal. As shown in FIG. 7, a proxied terminal may automatically synchronize with the time server of internet, and automatically update the time of the proxied terminal.

Upon detecting that proxied terminals update the time of the proxied terminals, the proxy detection device adds +24 seconds to the first update of time of the same internet account, i.e. 24 seconds faster than the standard time, adds −24 seconds to the second update of time, i.e. 24 seconds slower than the standard time, adds +12 seconds to the third update of time, adds −12 seconds to the fourth update of time, and adds 0 seconds to the fifth update time, and so on. By such a discretization process, the time of each proxied terminal is different from each other as far as possible. After such a discretization process, the subsequent clustering process may become easier, and more proxy access may be detected.

Figure 8:
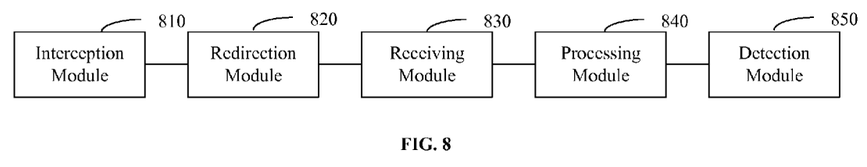
FIG. 8 illustrates an exemplary system for detecting proxy internet access consistent with the disclosed embodiments.

FIG. 8 illustrates a structural block diagram of an exemplary system for detecting proxy internet access. As shown in FIG. 8, the system for detecting proxy internet access comprises an interception module 810, a redirection module 820, a receiving module 830, a processing module 840, and a detection module 850.

The interception module 810 is configured to intercept the access requests of the same internet account. The redirection module 820 is configured to send a redirection packet to an access request, where the redirection packet carries the first timestamp of the moment when the redirection packet is sent. The redirection packet includes a preset script code.

The receiving module 830 is configured to receive the reported timestamp difference between the first timestamp and the second timestamp, where the second timestamp is the system time of the proxied terminal acquired after the proxied terminal receives the redirection packet. After receiving a redirection packet, the proxied terminal executes the script code to get the system time of the proxied terminal, and calculates the difference between the first timestamp and the system time.

The processing module 840 is configured to execute a clustering process to the reported timestamp differences to obtain a clustering result.

In the present exemplary embodiment, the processing module 840 is also configured to determine whether a reported timestamp difference is reported for the first time. If the reported timestamp difference is reported for the first time, the processing module generates a new cluster, with the cluster center of the new cluster being the reported timestamp difference. If the reported timestamp difference is not reported for the first time, the processing module calculates the shortest distance between the reported timestamp difference and the existing cluster center, and determines whether the shortest distance is larger than or equal to a distance threshold.

If the shortest distance is larger than or equal to the distance threshold, the processing module generates a new cluster, with the cluster center of the new cluster being the reported timestamp difference. If the shortest distance is less than the distance threshold, the processing module updates the cluster center of the shortest distance, and updates the number of hits on the cluster by reported timestamp differences, and determines whether the updated number of hits is larger than or equal to a number threshold.

If the updated number of hits is larger than or equal to the number threshold, the cluster is represented as an effective proxied terminal, and the number of proxied terminals under the same internet account increases by one (1). If the number of hits is less than the number threshold, the number of proxied terminals under the same internet account remains unchanged.

Specifically, if there are more than one cluster centers, the processing module calculates the distance of the reported timestamp difference to each cluster center, and then chooses the shortest distance.

The detection module 850 is configured to, based on the clustering result, determine whether the same internet account is a proxy access account.

In the method for detecting proxy internet access, the system for detecting proxy internet access intercepts the access requests of the same internet account, sends redirection packets which carry the first time stamp, and receives the timestamp differences between the first timestamp and the second timestamp acquired after the proxied terminal receives the redirection packets. By executing clustering process on the timestamp differences, the system for detecting proxy internet access can, based on the clustering results, determine whether the same internet account is a proxy account.

By categorizing the timestamp difference between the timestamp of sending the redirection packet and the timestamp after the proxied terminal receives the redirection packet, the disclosed method for detecting proxy internet access may avoid the detection error due to the changes of the ID information of the IP packet and the serial number information of the TCP packet, and thus the detection accuracy is increased.

Figure 9:
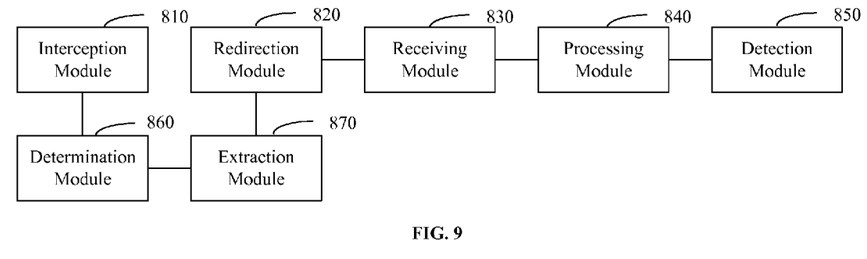
FIG. 9 illustrates another exemplary system for detecting proxy internet access consistent with the disclosed embodiments.

FIG. 9 illustrates another exemplary system for detecting proxy internet access. As shown in FIG. 9, the system for detecting proxy internet access comprises an interception module 810, a redirection module 820, a receiving module 830, a processing module 840 and a detection module 850, and the system further comprises a determination module 860 and extraction module 870.

The determination module 860 is configured to, after intercepting an access request of the same internet account, determine whether the access request is a response to a redirection packet. If the access request is not a response to a redirection packet, the determination module 860 further determines whether the data interval between the present access request and the last redirection packet exceeds a preset time interval.

The extraction module 870 is configured to, when the access request is determined be a response to a redirection packet, obtain the timestamp difference between the first timestamp and the second timestamp from the response.

The redirection module 820 is also configured to, when the data interval between the present access request and the last redirection packet exceeds a preset time interval, send a redirection packet to the access request. The redirection packet carries the first timestamp of the moment when the redirection packet is sent.

Figure 10:
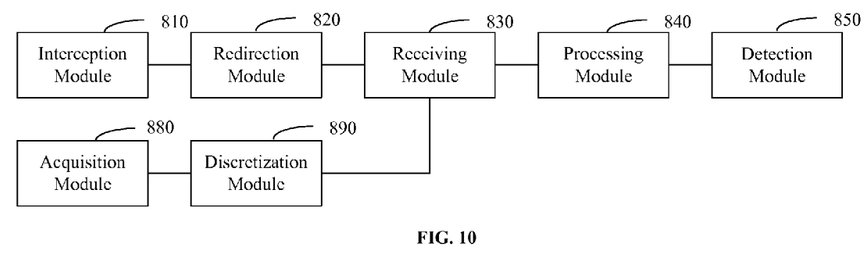
FIG. 10 illustrates another exemplary system for detecting proxy internet access consistent with the disclosed embodiments.

FIG. 10 illustrates another exemplary system for detecting proxy internet access. As shown in FIG. 10, the system for detecting proxy internet access comprises an interception module 810, a redirection module 820, a receiving module 830, a processing module 840 and detection module 850, and the system further comprises an acquisition module 880 and a discretization module 890.

The acquisition module 880 is configured to acquire the preset maximum allowable number of proxied terminals under the same internet account, as well as to obtain the required number of discrete time based on the maximum allowable number of proxied terminals, and further to obtain the predetermined sequence of the required number of discrete time.

For example, if the maximum allowable number of proxied terminals is four (4), the required number of the discrete time is five (5). The predetermined sequence of the required number of the discrete time may be +24 seconds, −24 seconds, +12 seconds, −12 seconds and 0 seconds. As shown in FIG. 6, the discrete time values are +24 seconds, −24 seconds, +12 seconds, −12 seconds, and 0 seconds.

The discretization module 890 is configured to, upon detecting the automatic update of the system time of each proxied terminal under the same internet account, according to the sequence of the required number of discrete time, sequentially execute a uniform discretization process on the system time of each proxied terminal.

Upon detecting that proxied terminals update the time of the proxied terminals, the discretization module 890 adds +24 seconds to the first update of time of the same internet account, i.e. 24 seconds faster than the standard time, adds −24 seconds to the second update of time, i.e. 24 seconds slower than the standard time, adds +12 seconds to the third update of time, adds −12 seconds to the fourth update of time, and adds 0 seconds to the fifth update time, and so on. By such a discretization process, the time of each proxied terminal is different from each other as far as possible. After such a discretization process, the subsequent clustering process may become easier, and more proxy access may be detected.

In certain exemplary embodiments, the system for detecting proxy internet access may comprises an intercepting module 810, a redirection module 820, a receiving module 830, a processing module 840, a detection module 850, a determination module 860, an extraction module 870, an acquisition module 880, and a discretization module 890.

The ordinary technical staff in this area may understand that all or part of the processes of the above-described embodiments of the method, may be achieved through instructing relevant hardware by a computer program. The program may be stored in a computer readable storage medium. By executing the program, processes of the above-described exemplary embodiments can be implemented. The storage medium may be a magnetic disk, an optical disk, a read-only memory (ROM), or a random access memory (RAM), and so on.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A method for detecting proxy internet access, comprising:
    intercepting an access request from a proxied terminal of a same internet account;
    sending a redirection packet to the proxied terminal sending the access request, wherein the redirection packet carries a first timestamp indicating when the redirection packet is sent;
    receiving a reported timestamp difference between the first timestamp and a second timestamp, wherein the second timestamp is a system time of the proxied terminal acquired after the proxied terminal receives the redirection packet;
    executing a clustering process on the reported timestamp difference to obtain a clustering result; and
    based on the clustering result, detecting whether the same internet account is a proxy account.

2. The method for detecting proxy internet access according to claim 1, wherein executing a clustering process on the reported timestamp difference to obtain a clustering result further includes:
    determining whether the reported timestamp difference is reported for a first time; and
    when the reported timestamp difference is reported for the first time, generating a new cluster, with a cluster center of the new cluster being the reported timestamp difference.

3. The method for detecting proxy internet access according to claim 2, further including:
    when the reported timestamp difference is not reported for the first time, calculating a shortest distance between the reported timestamp difference and an existing cluster center;
    determining whether the shortest distance is larger than or equal to a distance threshold; and when the shortest distance is larger than or equal to the distance threshold, generating the new cluster, with the cluster center of the new cluster being the reported timestamp difference.

4. The method for detecting proxy internet access according to claim 3, further including:
when the shortest distance is less than a distance threshold, updating the cluster center of the shortest distance, and updating a number of hits on the cluster by reported timestamp differences;
determining whether the updated number of hits is larger than or equal to a number threshold;
when the updated number of hits is larger than or equal to the number threshold, determining the cluster as an effective proxied terminal, and increasing a number of proxied terminals under the same internet account by one (1); and
when the number of hits is less than the number threshold, keeping the number of proxied terminals under the same internet account unchanged.

5. The method for detecting proxy internet access according to claim 1, further including:
getting a preset maximum allowable number of proxied terminals under the same internet account;
based on the maximum allowable number of proxied terminals, obtaining a required number of discrete time and a predetermined sequence of the required number of discrete time; and
upon detecting an automatic update of the system time of each proxied terminal under the same internet account, according to the sequence of the required number of discrete time, sequentially executing a uniform discretization process on the system time of each proxied terminal.

6. The method for detecting proxy internet access according to claim 1, after intercepting an access request from the same internet account, further including:
determining whether the access request is a response to a redirection packet;
when the access request is a response to a redirection packet, receiving the timestamp difference between the reported first timestamp and the second timestamp; and
when the access request is not a response to a redirection packet, determining whether a time interval between a present access request and a last redirection packet exceeds a preset time threshold.

7. The method for detecting proxy internet access according to claim 6, further including:
when the time interval between the present access request and the last redirection packet exceeds the preset time threshold, sending a redirection packet to the proxied terminal sending the access request; and
when the time interval between the present access request and the sending of last redirection packet does not exceed the preset time threshold, not sending any redirection packet to the proxied terminal sending the access request.

8. The method for detecting proxy internet access according to claim 1, wherein the redirection packet includes a preset script code; after receiving a redirection packet, the proxied terminal executes the script code to get the system time of the proxied terminal, and calculates a difference between the first timestamp and the system time.

9. A system for detecting proxy internet access, comprising:
a memory for storing instructions;
a network device for receiving access requests; and
a processor coupled to the memory and the network device for executing the instructions and configured to:
intercept the access requests of a same internet account;
send a redirection packet to an access request, wherein the redirection packet carries the first timestamp indicating when the redirection packet is sent;
receive the reported timestamp difference between the first timestamp and the second timestamp, wherein the second timestamp is the system time of the proxied terminal acquired after the proxied terminal receives the redirection packet;
execute a clustering process on the reported timestamp differences to obtain a clustering result; and
based on the clustering result, determine whether the same internet account is a proxy access account.

10. The system for detecting proxy internet access according to claim 9, wherein:
the processor is also configured to determine whether a reported timestamp difference is reported for a first time; when the reported timestamp difference is reported for the first time, the processor generates a new cluster, with the cluster center of the new cluster being the reported timestamp difference; when the reported timestamp difference is not reported for the first time, the processor calculates the shortest distance between the reported timestamp difference and the existing cluster center, and determines whether the shortest distance is larger than or equal to a distance threshold;
when the shortest distance is larger than or equal to the distance threshold, the processor generates a new cluster, with the cluster center of the new cluster being the reported timestamp difference; when the shortest distance is less than the distance threshold, the processor updates the cluster center of the shortest distance, and updates the number of hits on the cluster by reported timestamp differences, and determines whether the updated number of hits is larger than or equal to a number threshold; and
when the updated number of hits is larger than or equal to the number threshold, the cluster is represented as an effective proxied terminal, and the number of proxied terminals under the same internet account increases by one (1); when the number of hits is less than the number threshold, the number of proxied terminals under the same internet account remains unchanged.

11. The system for detecting proxy internet access according to claim 9, the processor is further configured to:
acquire a preset maximum allowable number of proxied terminals under the same internet account, as well as to obtain a required number of discrete time based on the maximum allowable number of proxied terminals, and further to obtain a predetermined sequence of the required number of discrete time; and
upon detecting an automatic update of the system time of each proxied terminal under the same internet account, according to the sequence of the required number of discrete time, sequentially execute a uniform discretization process on the system time of each proxied terminal.

12. The system for detecting proxy internet access according to claim 9, the processor is further configured to:
after intercepting an access request of the same internet account, determine whether the access request is a response to a redirection packet, and when the access request is determined to be not a response to a redirection packet, further determine whether the data interval between the present access request and the last redirection packet exceeds a preset time interval;

when the access request is determined to be a response to a redirection packet, obtain the timestamp difference between the first timestamp and the second timestamp from the response; and when the data interval between the present access request and the last redirection packet exceeds a preset time interval, send a redirection packet to the access request, where the redirection packet carries the first timestamp of the moment when the redirection packet is sent.

13. The system for detecting proxy internet access according to claim 9, where the redirection packet includes a preset script code, and the proxied terminal, after receiving a redirection packet, executes the script code to get the system time of the proxied terminal, and calculates the difference between the first timestamp and the system time.

14. A non-transitory computer-readable medium having computer program for, when being executed by a processor, performing a method for detecting proxy internet access, the method comprising:

intercepting an access request from a proxied terminal of a same internet account;

sending a redirection packet to the proxied terminal sending the access request, wherein the redirection packet carries a first timestamp indicating when the redirection packet is sent;

receiving a reported timestamp difference between the first timestamp and a second timestamp, wherein the second timestamp is a system time of the proxied terminal acquired after the proxied terminal receives the redirection packet;

executing a clustering process on the reported timestamp difference to obtain a clustering result; and based on the clustering result, detecting whether the same internet account is a proxy account.

15. The non-transitory computer-readable medium according to claim 14, wherein executing a clustering process on the reported timestamp difference to obtain a clustering result further includes:

determining whether the reported timestamp difference is reported for a first time; and when the reported timestamp difference is reported for the first time, generating a new cluster, with a cluster center of the new cluster being the reported timestamp difference.

16. The non-transitory computer-readable medium according to claim 15, the method further including:

when the reported timestamp difference is not reported for the first time, calculating a shortest distance between the reported timestamp difference and an existing cluster center;

determining whether the shortest distance is larger than or equal to a distance threshold; and when the shortest distance is larger than or equal to the distance threshold, generating the new cluster, with the cluster center of the new cluster being the reported timestamp difference.

17. The non-transitory computer-readable medium according to claim 16, the method further including:

when the shortest distance is less than a distance threshold, updating the cluster center of the shortest distance, and updating a number of hits on the cluster by reported timestamp differences;

determining whether the updated number of hits is larger than or equal to a number threshold;

when the updated number of hits is larger than or equal to the number threshold, determining the cluster as an effective proxied terminal, and increasing a number of proxied terminals under the same internet account by one (1); and when the number of hits is less than the number threshold, keeping the number of proxied terminals under the same internet account unchanged.

18. The non-transitory computer-readable medium according to claim 14, the method further including:

getting a preset maximum allowable number of proxied terminals under the same internet account;

based on the maximum allowable number of proxied terminals, obtaining a required number of discrete time and a predetermined sequence of the required number of discrete time; and upon detecting an automatic update of the system time of each proxied terminal under the same internet account, according to the sequence of the required number of discrete time, sequentially executing a uniform discretization process on the system time of each proxied terminal.

19. The non-transitory computer-readable medium according to claim 14, after intercepting an access request from the same internet account, the method further including:

determining whether the access request is a response to a redirection packet;

when the access request is a response to a redirection packet, receiving the timestamp difference between the reported first timestamp and the second timestamp; and when the access request is not a response to a redirection packet, determining whether a time interval between a present access request and a last redirection packet exceeds a preset time threshold.

20. The non-transitory computer-readable medium according to claim 19, the method further including:

when the time interval between the present access request and the last redirection packet exceeds the preset time threshold, sending a redirection packet to the proxied terminal sending the access request; and when the time interval between the present access request and the sending of last redirection packet does not exceed the preset time threshold, not sending any redirection packet to the proxied terminal sending the access request.

* * * * *